United States Patent
Achaoui et al.

(10) Patent No.: US 10,538,848 B2
(45) Date of Patent: Jan. 21, 2020

(54) METHOD FOR CONTROLLING AT LEAST ONE GAS BUBBLE PRODUCED IN A LOCALISED MANNER

(71) Applicants: Centre National de la Recherche Scientifique, Paris (FR); Universite d'Aix Marseille, Marseilles (FR); Ecole Centrale de Marseille, Marseilles (FR)

(72) Inventors: Younes Achaoui, Marseilles (FR); Serge Mensah, Marseilles (FR); Zoubida Hammadi, Marseilles (FR); Roger Claude Marcel Morin, Marseilles (FR); Eric Debieu, Marseilles (FR); Cédric Alain François Marie Payan, Marseilles (FR)

(73) Assignees: Centre National de la Recherche Scientifique, Paris (FR); Ecole Centrale de Marseille, Marseilles (FR); Universite d'Aix Marseille, Marseilles (FR)

( * ) Notice: Subject to any disclaimer, the term of this patent is extended or adjusted under 35 U.S.C. 154(b) by 284 days.

(21) Appl. No.: 15/512,666

(22) PCT Filed: Sep. 25, 2015

(86) PCT No.: PCT/IB2015/057398
§ 371 (c)(1),
(2) Date: Mar. 20, 2017

(87) PCT Pub. No.: WO2016/046806
PCT Pub. Date: Mar. 31, 2016

(65) Prior Publication Data
US 2017/0292199 A1   Oct. 12, 2017

(30) Foreign Application Priority Data
Sep. 26, 2014 (FR) .................................. 14 59127

(51) Int. Cl.
*B06B 1/02* (2006.01)
*C25B 15/02* (2006.01)
*C25B 1/04* (2006.01)

(52) U.S. Cl.
CPC ............ *C25B 15/02* (2013.01); *B06B 1/0215* (2013.01); *C25B 1/04* (2013.01)

(58) Field of Classification Search
None
See application file for complete search history.

(56) References Cited

U.S. PATENT DOCUMENTS 8,273,236 B2    9/2012  Sano et al.
2010/0241059 A1*  9/2010  Prushinskaya ........ A61M 37/00
                                                    604/20

(Continued)

FOREIGN PATENT DOCUMENTS

WO    2008/140255 A1   11/2008
WO    2013/179684 A1   12/2013

OTHER PUBLICATIONS

Hammadi et al, Field Nano-localization of Gas Bubble Production from Water Electrolysis, Applied Physics Letter 103, 223106 (2013) (Year: 2013).*

(Continued)

*Primary Examiner* — Salil Jain
(74) *Attorney, Agent, or Firm* — Morgan, Lewis & Bockius LLP (57) ABSTRACT

The invention concerns a method for controlling at least one gas bubble produced in a localised manner in a medium (3') allowing the movement of said at least one gas bubble, characterised in that it comprises a step consisting of generating at least one ultrasound burst towards said at least one gas bubble, said at least one burst being emitted for a burst (Continued)

duration at least partially covering a duration during which said gas is effectively being produced.

15 Claims, 3 Drawing Sheets

(56) References Cited

U.S. PATENT DOCUMENTS

2012/0055805 A1* 3/2012 Kirchoff .................. C25B 1/04
  205/637
2014/0373539 A1* 12/2014 Parisi ...................... F23L 7/002
  60/645

OTHER PUBLICATIONS

International Search Report issued in corresponding International Patent Application No. PCT/IB2015/057398 dated Feb. 24, 2016.
Ashokkumar et al., "Bubbles in an acoustic field: An overview," Ultrasonics Sonochemistry, 14: 470-475 (2007).
Hammadi et al., "Field nano-localization of gas bubble production from water electrolysis," Applied Physics Letters, 103: 223106 (2013).
Cataldo, "Effects of ultrasound on the yield of hydrogen and chlorine during electrolysis of aqueous solutions of NaCl HCl," Journal of Electroanalytical Chemistry, 332: 325-331 (1992).

* cited by examiner

Fig. 1
*(Prior art; controlled electrolytic medium)*

Fig. 2
*(Prior art; controlled electrolytic medium)*

*Fig. 3*
(Prior art; controlled electrolytic medium)

METHOD FOR CONTROLLING AT LEAST ONE GAS BUBBLE PRODUCED IN A LOCALISED MANNER

The invention relates to method for controlling at least one locally produced gas bubble.

There exist different methods of this type.

For example, mention can be made of a method to generate localised gas bubbles using microfluidics such as described in the article by P. Garstecki et al. «Formation of bubbles and droplets in microfluidic systems». Bulletin of the Polish Academy of Science, 2005, Vol. 53, No. 4 (D1), hi D1 a liquid is caused to pass through micro-channels, a gas is used to shear the flow and a capillary evacuates the gas bubbles. The gas bubbles thus produced are necessarily located at the exit from this capillary.

To produce and control gas bubbles with this method, very special conditions must be provided. It is effectively necessary to fabricate the micro-channels in a clean room and to use highly pure liquids in a clean environment to prevent any clogging of the micro-channels or capillaries e.g. with dust. In addition, it is necessary to add a surfactant. This surfactant modifies the properties of the medium in which the gas bubbles are contained. The frequency and size of the bubbles are regulated, determined to a certain extent by the dimensions of the nozzle, by adjusting gas pressure and liquid flow rate.

Another method is proposed in the article by Hammadi et al., « Field nano-localization of gas bubble production from water electrolysis », Applied Physic Letters, 103, 223106 (2013) (D2) and is described in detail below.

D2 shows that, in a electrolytic medium with perfect ion and dissolved gas control (chemically controlled) for instance a solution of $H_2SO_4$ at low concentration ($10^{-5}$ a $10^{-2}$ mol·$l^{-1}$ in an aqueous medium), using an electrode with a pointed tip and a counter-electrode both immersed in the electrolytic medium, it is possible to generate gas bubbles in localised manner at the tip of the electrode, at the pointed end of this tip.

For this purpose, judicious adjustment is required of the voltage (amplitude and frequency of the voltage signal) applied between the electrode and counter-electrode.

Figure 1:
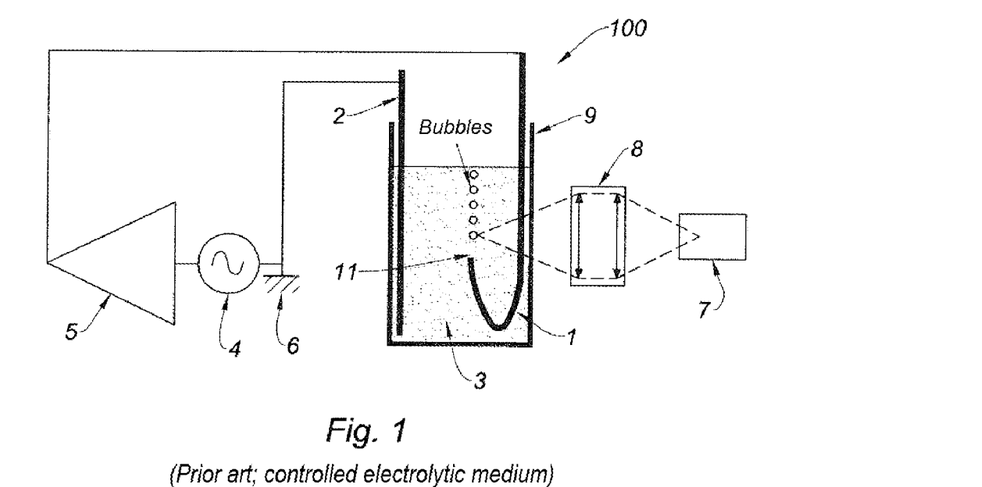
FIG. 1 illustrates a prior art device.

The device 100 used in D2 is reproduced in FIG. 1.

It essentially comprises an electrode 1 having a pointed tip 11 made of platinum for example, and a counter-electrode 2 e.g. in platinum, both electrodes being immersed in the electrolytic medium 3. The electrode 1 is connected for example via a voltage amplifier 5 to a voltage source 4 which here produces a periodic alternating voltage, the amplitude and frequency of which can be adjusted. The counter-electrode 2 is connected to the source 4 to close the circuit. The counter-electrode 2 and one of the terminals of the source 4 are connected to the earth 6.

A camera 7 is provided to visualise the gas bubbles leaving the electrode 1. An optical device 8 can be envisaged between the camera 7 and the vessel 9 containing the electrolytic medium 3 in which the gas bubbles are produced. The camera 7 allows measurements to be performed on these gas bubbles (bubbles of $O_2$ or $H_2$), allowing characterization of the electrolysis phenomenon taking place which occurs in numerous practical applications. The camera 7 and the associated optical device 8 allow the real-time detection and control of the size of the gas bubbles produced.

Figure 2:
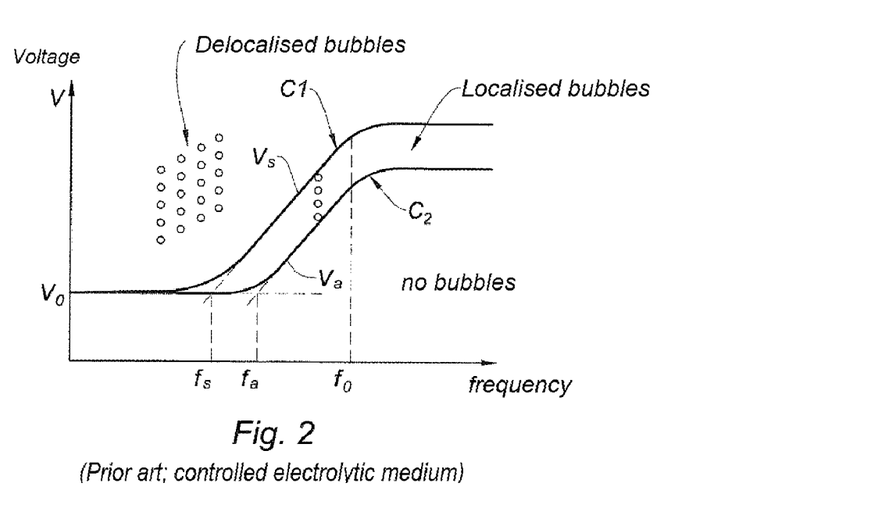
FIG. 2 schematically illustrates different types of gas bubble generation on an electrode as a function of the value of the voltage V and frequency f of the alternating voltage signal sent by an associated source.

FIG. 2 schematically illustrates the different types of gas bubble generation on the electrode 1, as a function of the value of the voltage V and frequency f of the alternating voltage signal sent by the associated source 4 (production of gas bubbles delocalised over the entire electrode 1; production of gas bubbles localised at the tip of the electrode 1; no production of gas bubbles).

In particular, it is noted that the production of gas bubbles localised at the tip of the electrode 1 is obtained with peak-to-peak voltage values of between $V_a$ and $V_s$ and a frequency higher than $f_s$; namely, between the two voltage curves $V_a$ and $V_s$ (Example of a coning angle tip in the order of 60°, $V_a$=60V, $V_s$=300V for frequencies of between 80 Hz and 400 Hz).

Figures 3, 7:
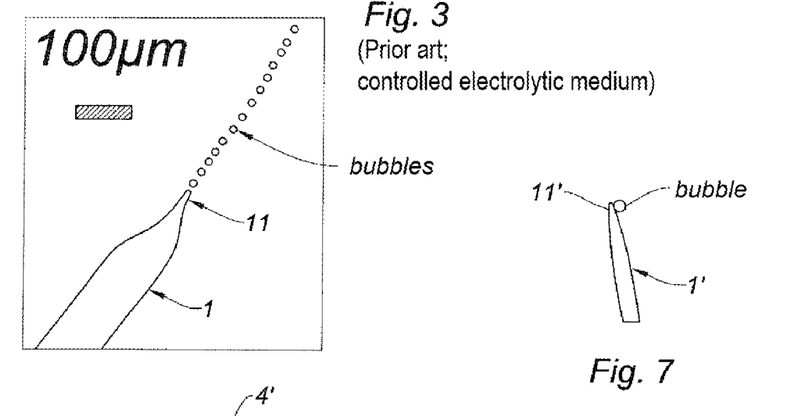
FIG. 3 illustrates a view given by a camera of production of gas bubbles localised at the tip of an electrode.
FIG. 7 illustrates the production of calibrated, regularly spaced gas bubbles conforming to the method the invention implemented with the device in FIG. 5, under application conditions differing from those in FIG. 6.

Under these conditions, FIG. 3 illustrates a view given by the camera 7 which clearly proves that the production of gas bubbles is localised at the tip of the electrode 1, and additionally that calibrated, gas bubbles are generated that are regularly spaced apart, i.e. gas bubbles of similar dimension to within a few percent and with regular spacing (this regularity is related to the fact that the signal sent by the source 4 is periodic; however, control of the spacing between bubbles is perfectly possible without the signal being periodic).

It is to be noted that exact values of $V_a$, $V_s$ and $f_s$ depend on the concentration of $H_2SO_4$ in the electrolytic medium 3.

These values, as can be seen in FIG. 2 for an electrode with given pointed shape and given chemically controlled electrolytic medium, allow the defining of an «operating space» in which it is known that the detection can be made of the presence of localised gas bubbles. Also, by detecting monodisperse gas bubbles, it is possible to locate this «operating space», without prior knowledge of the type of pointed electrode and of the chemically controlled electrolytic medium.

The method proposed in document D2 therefore allows the production of calibrated gas bubbles with controlled spacing, in particular regular spacing when the signal on the electrode is periodic.

The implementation of the method in D2 is easier than the method in D1 restricted by the inertia of the fluid and gas, especially to obtain calibrated gas bubbles with controlled spacing.

However, the method proposed by D2 has some limitations.

For example, an electrolytic medium that is perfectly controlled chemically needs to be provided to obtain calibrated gas bubbles having controlled spacing. In addition, the stability over time of the size of the gas bubbles produced is not always satisfactory.

The authors of document D2 subsequently replaced the chemically controlled electrolytic medium by a non-chemically controlled electrolytic medium e.g. a non-controlled aqueous medium such as tap water.

There is effectively a need to be able to produce gas bubbles locally in an electrolytic medium that is not chemically controlled such as a non-chemically controlled aqueous medium (e.g. tap water), said gas bubbles being calibrated and the spacing between these gas bubbles being controlled. This would provide a better understanding of the electrolysis phenomenon occurring in numerous practical applications using an electrolytic medium that is not chemically controlled, such as tap water which is largely available and at low cost.

However, when using the prior art device 100 illustrated in FIG. 1 with an electrolytic medium that is not chemically controlled such as tap water, the applicant observed that it is not possible to produce gas bubbles that are both localised at the tip of the electrode and more specifically at the end of this tip, and calibrated and also have controlled spacing.

Figure 4:
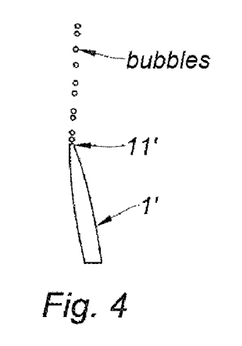
FIG. 4 illustrates a view taken by a camera when the electrolytic medium is an aqueous non-chemically controlled medium, in this case tap water.

This is shown in FIG. 4 giving an image taken by the camera 7 when the electrolytic medium 3 is an aqueous non-chemically controlled medium, in this case tap water.

Localised production of gas bubbles is seen to occur under certain conditions of voltage and frequency provided by the source 4, but these gas bubbles have most varied dimensions and are therefore not calibrated, and in addition the production and distribution of the gas bubbles appear to be random.

Also, the applicant was additionally able to ascertain that the size of the gas bubbles produced is not at all stable over time.

Said controlling would be of particular advantage for a chemically controlled electrolytic medium, more generally for an electrolytic medium (controlled or not controlled) and even more generally for any method allowing the localised production of gas bubbles i.e. whether or not the medium under consideration is an electrolytic medium.

It is one objective of the invention to propose a method providing improved control over gas bubbles produced in localised manner.

For this purpose, the invention proposes a method to control at least one gas bubble produced in localised manner in a medium allowing the displacement of said at least one gas bubble, characterized in that it comprises a step consisting of generating at least one ultrasound burst in the direction of said at least one gas bubble, said at least one burst being emitted over a burst length at least partly overlapping a time during which gas is effectively produced.

The method may comprise at least one of the following steps taken alone or in combination:
  locally produced gas bubbles are controlled at a controlled frequency, which amounts to saying that the localised production of gas bubbles is controlled at a frequency called controlled production frequency, and ultrasound bursts are generated that are repeated at a repeat frequency equal to or substantially equal to the controlled localised production frequency of the gas bubbles;
  it comprises the following steps: applying a voltage signal between an electrode and counter-electrode immersed in an electrolytic medium, the electrode having a pointed shape, and controlling the frequency and amplitude of said voltage signal to produce gas bubbles in the electrolytic medium in localised manner at the tip of the electrode and at a controlled frequency namely said controlled production frequency;
  the frequency of the voltage signal is controlled so that said signal is periodic;
  the voltage signal is sinusoidal, rectangular, sawtooth or in the form of a Dirac comb;
  the voltage signal is alternating;
  the control frequency of the localised production of gas bubbles and the repeat frequency of ultrasound bursts are modified so that this repeat frequency remains equal to or substantially equal to the controlled localised production frequency of gas bubbles to modify the spacing between bubbles;
  it comprises the following steps: applying a voltage signal between an electrode and counter-electrode immersed in an electrolytic medium, the electrode having a pointed shape, and controlling the amplitude of said voltage signal to produce said at least one gas bubble in the electrolytic medium in localised manner at the tip of the electrode;
  the voltage signal is a Dirac peak;
  the amplitude of the voltage signal is modified to control the size of said at least one gas bubble produced;
  it comprises a step to adjust the duration of the or of each ultrasound burst to control the size of said at least one gas bubble produced;
  it comprises a step consisting of starting an ultrasound burst after the start of production of said at least one gas bubble;
  the medium allowing the displacement of said at least one gas bubble is a liquid medium or a gel;
  the medium allowing the displacement of said at least one gas bubble is a non-chemically controlled liquid medium;
  the non-chemically controlled liquid medium is an aqueous medium such as tap water;
  the acoustic pressure of the ultrasound waves in the or in each burst is between 5 kPa and 15 kPa.

The invention will be better understood and other objectives, advantages and characteristics thereof will become more clearly apparent on reading the following description given in connection with the appended drawings in which:

FIG. 5 illustrates a device allowing implementation of the method of the invention, which in particular comprises means to generate ultrasound waves, in a first view conforming to FIG. 5(*a*) and a second view conforming to FIG. 5(*b*) that is a side view in relation to the view in FIG. 5(*a*);

Figure 5A:
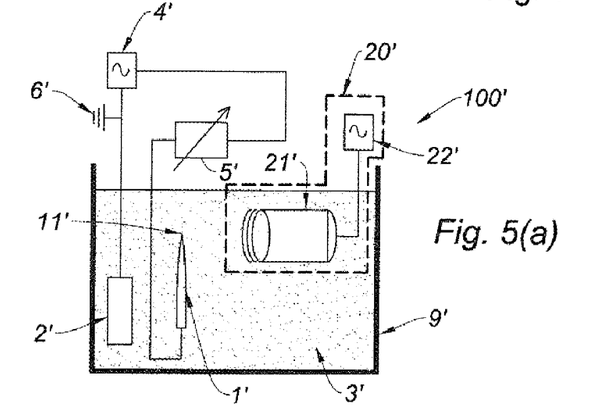

The device 100', such as illustrated in FIG. 5 allowing implementation of a method included in the scope of the invention comprises the same elements as the prior art device 100 illustrated in FIG. 1.

Figure 5B:
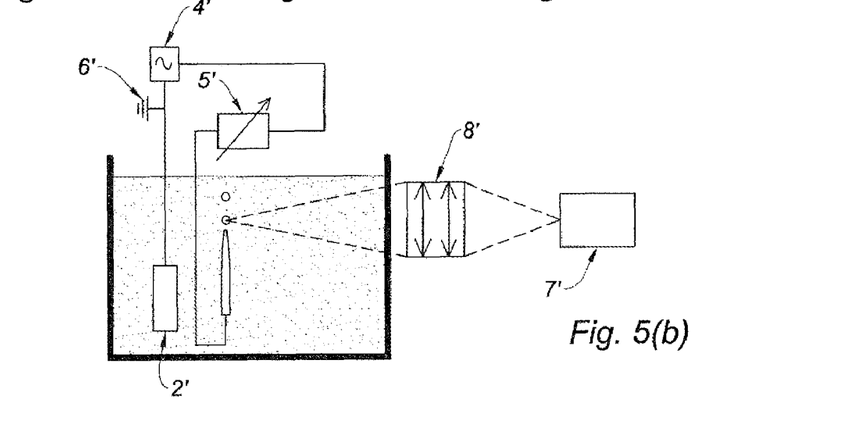

The device 100' essentially comprises an electrode 1' having an end 11' that is pointed and a counter-electrode 2', both electrodes being immersed in an electrolytic medium 3'. The electrode 1' is connected for example via a voltage amplifier 5', to a voltage source 4' of which the amplitude and/or frequency can optionally be adjusted. The counter-electrode 2' is connected to the source 4' to close the circuit. The counter-electrode 2' and one of the terminals of the source 4' are also connected to the earth 6'. A camera 7' and optical device 8' are provided to detect and characterize the gas bubbles as in the prior art device 100 illustrated in FIG. 1, and are illustrated in FIG. 5(b) which is partial side view of the view in FIG. 5(a). Instead of the camera 7' associated with the optical device 8', it is possible however to envisage any other detector adapted for this purpose (e.g. acoustic, resistive, capacitive detector . . . ).

The electrolytic medium 3' however is not chemically controlled. In particular, it may be tap water.

An electrolytic medium e.g. liquid, chemically non-controlled is a medium in which there is no control of ions and dissolved gases. It is recalled that a definition of a chemically controlled electrolytic medium was given above when presenting article D2, said medium being associated with an electrolytic medium wherein ions and dissolved gases are fully controlled.

This chemically non-controlled electrolytic medium is generally a liquid medium or gel having sufficient electrical conductivity to allow the displacement of electrical charges (ions) for the obtaining, at the selected frequency of the voltage signal, of at least one reduction reaction (at the cathode) and/or oxidation (at the anode). This allows the generating of a predetermined quantity of gas. Preferably, the value of this electrical conductivity is selected within the range of 0.5 to 0.00005 siemens/metre.

The device 100' differs however from the prior art device 100 illustrated in FIG. 1 through the presence of means 20' to generate ultrasound waves at a power (amplitude; pressure of acoustic wave) and frequency that are adjustable. These means 20' comprise an ultrasound generator 21' connected to a voltage source 22' with adjustable amplitude and frequency.

Example of Embodiment of a Device 100' to Implement a Method Included in the Scope of the Invention (Example 1)

The electrode 1' and counter-electrode 2' are made of platinum.

The electrode 1' is of L type.

The non-chemically controlled electrolytic medium 3' is tap water (cf. standards http://www.cieau.com: «quality of tap water .pdf»; Ph measured for this test 7.5; the mean Ph of Marseille mains water where this test was performed being 8.1 and more generally between 6.5 and 9).

The above conditions are those which lead to the situation illustrated in FIG. 4.

In the example in FIG. 4, the source 4' connected to the electrodes 1', 2', generates a first periodic alternating control signal, here sinusoidal, having a frequency of 10 Hz and amplitude of $50V_{pp}$ (peak-to-peak).

The source 22' associated with the ultrasound generator 21' allows the generation of a second control signal comprising ultrasound bursts.

Each burst is emitted over a time called «burst length» e.g. 10 ms, at a frequency of 1 MHz (in practice this corresponds to several thousand cycles over one burst length). It is under these conditions that this example was carried out.

In general, the ultrasounds have frequencies between 16 kHz and 100 MHz (for example), which in all cases allows the generation of at least a few hundred ultrasound bursts during one burst length.

Each ultrasound burst can be centred on an extreme value of the first control signal, here a periodic sinusoidal alternating signal, when the production of gas bubbles is greatest.

It may be otherwise, the key point being that the burst length at least partly overlaps a duration of the first control signal during which gas bubbles are effectively produced. For the test, the ultrasound generator 21' was used under the aforementioned conditions.

In addition, the successive bursts must be generated at a repeat frequency equal to or substantially equal to the frequency of the voltage signal received from the source 4', namely 10 Hz in this case.

Also, the acoustic pressure of the ultrasound on each burst was about 10 kPa in this test (this can be obtained for example with an (masonic 1 MHz transducer, Ø=32 mm, focused at 9 cm, Ref 1718 C104; 10 V). More generally, an ultrasound acoustic pressure of between 5 kPa and 15 kPa could be envisaged. In general, the acoustic pressure must be sufficiently high to allow an agglomeration of bubbles and at the same time, sufficiently low to avoid the generation of interfering bubbles, which for instance would be related to achieving the cavitation regime.

Under these conditions, the gas bubbles have a diameter of about 17 microns, with 4% variation (calibration). Also, the distance separating two successive gas bubbles is about 400 microns.

Figure 6:
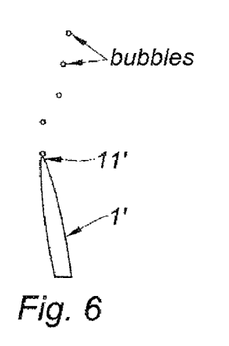
FIG. 6 illustrates the production of calibrated gas bubbles that are regularly spaced conforming to the method of the invention implemented with the device in FIG. 5.

This is the situation illustrated in FIG. 6.

Therefore, by comparing FIGS. 4 and 6, it can be noted that the particular ultrasound generation mode proposed in the invention, in this electrolytic non-chemically controlled medium 3', allows calibrated gas bubbles to be obtained moreover having a non-random arrangement. In addition, it is found that with the gas bubble generation method of the invention the size of the gas bubbles is stable over time.

Matching the frequency of burst repetition with the frequency of the first control signal (derived from source 4') allows gas bubbles to be obtained that are calibrated in relation to one another and have controlled spacing between two gas bubbles.

It is therefore possible, by changing the frequency of the first control signal and consequently the repeat frequency of the bursts, to vary the spacing between the gas bubbles. In particular, it is possible to generate a first series of gas bubbles with a first spacing, then to generate a second series of bubbles with a different spacing.

This correlation also allows the maintained stability of bubble size over time.

Each ultrasound burst length then provides control over the size of the gas bubbles produced. The longer the burst length the longer the time to group together the volume of gas produced by electrolysis.

For example, compared with Example 1 given above, by modifying each ultrasound burst length from 10 ms to 50 ms, the other hypotheses remaining the same, it is possible to produce gas bubbles of larger size.

This is the situation illustrated in FIG. 7.

In this FIG. 7, a gas bubble can be seen of size about 31 microns, larger than the size of 17 microns obtained with Example 1 detailed above (FIG. 6: length of each burst 10 ms).

In addition, the variation in the dimensions between the different gas bubbles remains below 4% (calibration), here also (FIG. 7).

End of Example 1.

It is to be noted that the size of the gas bubbles produced can be controlled other than by adjusting ultrasound burst length.

It is possible to adjust the amplitude of the voltage source 4' powering the electrode 1' to impact the production of gas bubbles at the tip 11' of electrode 1'. The size of the gas bubbles produced at the tip 11' of electrode 1 increases with the voltage of the first control signal (in practice, the amplitude of the signal is modified). This pathway is less practical however since it can lead to delocalisation of gas bubble production or quite simply to no further production of gas bubbles (cf. the principles illustrated in FIG. 2 for an electrolytic medium 3 that is chemically controlled).

With control over the size of the gas bubbles produced, it is therefore possible to generate a first series of bubbles of a first size, to carry out an adjustment (preferably on burst length) to obtain a second series of bubbles having a second size and so forth.

In the case in Example 1, the signal received from the voltage source 4' (first control signal) supplying the electrode 1' is a periodic alternating signal that here is sinusoidal.

The form of this first alternating and periodic control signal is of little importance to obtain production of gas bubbles localised at the tip 11' of the electrode 1', whether or not the electrolytic medium is chemically controlled.

This periodic alternating signal (source 4') may therefore be a signal of sinusoidal form (the case in Example 1), square, rectangular, in the form of ramps or other form. All that is important remains the correlation between the frequencies of the first and second control signals, the acoustic pressure of the ultrasound bursts and that the burst length at least partly overlaps the duration of the first control signal during which gas bubbles are effectively produced.

Figure 8:
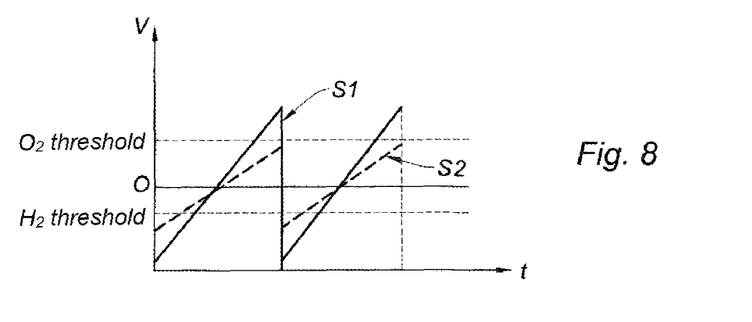
FIG. 8 illustrates alternating voltage signals able to be applied to a pointed electrode of the device in FIG. 5.

FIG. 8 illustrates an example of two periodic, alternating voltage signals able to be sent from source 4', and each in the form of ramps (sawtooth signal: signal S1; signal S2).

In the field of electrolysis, it is known that dioxygen ($O_2$) and dihydrogen ($H_2$) are produced at the anode and cathode respectively. However, with an alternating voltage signal such as a signal of ramp type, the electrode 1' is successively the anode or the cathode.

It is therefore possible to produce gas bubbles localised at the tip 11' of the electrode 1', which are:
either bubbles of dioxygen and dihydrogen, when the voltage is both above the production threshold of dihydrogen and the production threshold of dioxygen (i.e. positive threshold; dotted horizontal line), which corresponds to signal S1 in FIG. 8 (sawtooth signal; solid line);
or bubbles of dihydrogen when the voltage is above the production threshold of dihydrogen (negative threshold; dotted horizontal line) but below the production threshold of dioxygen bubbles (positive threshold) which corresponds to signal S2 in FIG. 8 (sawtooth signal; dotted line).

The alternating voltage signal of ramp type is selected since it allows the well-organised successive production of dioxygen and dihydrogen bubbles.

Figures 9, 10:
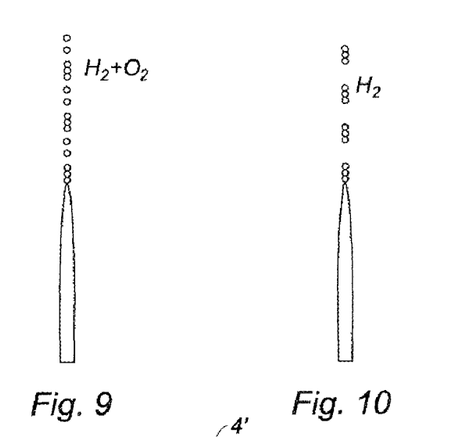
FIG. 9 illustrates the production of dioxygen and dihydrogen bubbles, obtained with the device in FIG. 5 and one of the signals illustrated in FIG. 8, in the absence of ultrasound.
FIG. 10 illustrates the production of dihydrogen bubbles obtained with the device in FIG. 5 and using the signals illustrated in FIG. 8, in the absence of ultrasound.

FIG. 9 illustrates a stream of dioxygen and dihydrogen bubbles successively produced at the tip 11' of the electrode 1', for an electrolytic solution 3' formed of tap water and with the voltage signal S1 illustrated in FIG. 8 of 10 Hz frequency.

FIG. 10 illustrates a stream of dihydrogen bubbles produced at the tip 11' of the electrode 1', for an electrolytic solution 3' formed of tap water and with a voltage signal S2 illustrated in FIG. 8 of frequency 10. Hz.

FIGS. 9 and 10 are to be compared with FIG. 4, the only difference being the voltage signal delivered by the source 4' (in comparison with the operating mode leading to the results in FIG. 4, the differences it is true concern the form of this signal but more especially the extreme values of the voltage of this signal, whether regarding signal S1 or signal S2).

In the two cases illustrated in FIGS. 9 and 10, it can be seen that the gas bubbles are neither calibrated nor regularly spaced.

Another Example of Embodiment of the Device 100' to Implement a Method Included in the Scope of the Invention (Example 2)

The source 22' associated with the ultrasound generator 21' was then further used to generate ultrasound bursts in addition to the conditions to implement the method which led to the results in FIG. 9. For this purpose, each burst was emitted over a burst length of 10 ms, at a frequency of 1 MHz and the successive bursts were generated at a repeat frequency equal to the frequency of the voltage signal S1 (production of $H_2$ and $O_2$) received from source 4', namely in this case of 10 Hz. The acoustic pressure applied by the ultrasound waves at each burst was about 10 kPa and was generally between 5 kPa and 15 kPa. Finally, the ultrasound burst length at least partly overlapped the duration of the sawtooth signal during which gas bubbles were effectively produced.

This led to the possibility of separating the dioxygen and dihydrogen bubbles and to the coalescing together of the dioxygen bubbles and the coalescing together of the dihydrogen bubbles.

Figure 11:
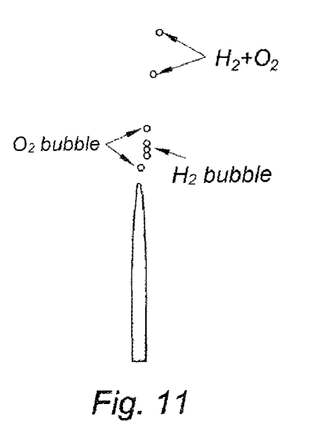
FIG. 11 illustrates the production of calibrated, regularly spaced dioxygen bubbles and calibrated, regularly spaced dihydrogen bubbles conforming to the method of the invention, obtained with the device in FIG. 5 and one of the signals illustrated in FIG. 8, in the presence of ultrasound.

More specifically as illustrated in FIG. 11, it was found that the first ultrasound burst allowed coalescence of the dioxygen bubbles together and of the dihydrogen bubbles together, and that a second ultrasound burst allowed the coalescence of the dioxygen bubbles with the dihydrogen bubbles.

If separation of the two gases is desired it is possible, by means of an arbitrary function generator, to separate the positive and negative arches of the first control signal in time in order to separate the coalesced dioxygen and dihydrogen bubbles in space and to prevent them from merging under ultrasound action.

In this manner, the dioxygen bubbles are calibrated and regularly spaced. This is also the case for the dihydrogen bubbles.

FIG. 11 is to be compared with FIG. 9, the only difference in the experimental conditions between these two Figures relating to application of ultrasound, conforming to the method of the invention, in the non-chemically controlled electrolytic medium 3'.

It is clear that signal S2 (FIG. 8), would lead to calibration of the dihydrogen bubbles which would also be arranged regularly in the stream of bubbles produced at the tip 11' of the electrode 1', as previously shown (FIG. 6) and having a size stable over time.

End of Example 2.

In the foregoing Examples, the case was cited of a periodic alternating signal of sinusoidal form (Example 1) emitted by the source 4', and of a periodic alternating signal in the form of ramps (Example 2). As already specified, any other form of periodic, alternating signal could be envisaged for the first control signal.

Also, a first periodic control signal that is not alternating could also be envisaged. It would thus be possible to produce gas bubbles of a given type that are calibrated and regularly spaced.

One first control signal able to be used for this purpose may be a sinusoidal signal having a mean value strictly higher or strictly lower than zero value.

Another first control signal able to be used for this purpose may be a periodic sequence of pulse signals (Dirac comb). In this case the time during which the first control signal effectively allows the production of gas bubbles corresponds to the width of the Dirac peak emitted by the source 4'. Burst length must then at least partly overlap the duration of the Dirac peak width.

In addition, it is to be noted that other types of non-periodic signals can be envisaged for this first control signal (source 4'), which may or may not be alternating. In this case, a trigger must be provided to synchronise the ultrasound source 22' emitting the second control signal with the source 4' emitting the first control signal, which would enable the source 22' to follow the same pattern associated with a non-periodic signal imposed by source 4'. This can be obtained for example with Dirac peaks emitted at non-regular time intervals from one peak to another. The gas bubbles formed at the tip 11' of the electrode 1' then remain calibrated, the size of these gas bubbles being stable over time, but their spacing is not periodic and differs as a function of the form of the first non-periodic control signal.

In general, irrespective of the form of the first control signal, it can be envisaged to start an ultrasound burst after the start of bubble production to allow the gas to accumulate, the key point again being that this ultrasound burst occurs when gas production is effective. It is thus possible to control the moment at which the gas bubbles are produced, namely when the burst starts, but also to control the size of the gas bubbles produced.

In the foregoing description, we were able to show the advantage of an ultrasound wave source so that it is possible, in a non-chemically controlled electrolytic medium, to calibrate gas bubbles, to control the spacing between the gas bubbles whether this spacing is periodic (regular spacing) or not (non-regular spacing) as a function of applied control signals that may or may not be periodic, and to ensure the good stability of the gas bubbles over time.

This latter aspect is of particular interest.

While it is possible, in a chemically controlled electrolytic medium (cf. article D2), to obtain calibrated gas bubbles having controlled spacing, the stability of these gas bubbles is not always satisfactory.

This is why the invention, while it is particularly advantageous for use in an electrolytic medium that is not chemically controlled, is also advantageous in that it can provide improved gas bubble stability over time in a controlled electrolytic medium.

Finally, all the aforementioned examples are based on gas bubble production carried out in an electrolytic medium since, in said medium, the use of a pointed electrode allows the generation of gas bubbles localised at the tip of the electrode (cf. article D2).

This electrolytic medium may be a liquid medium or a gel.

This is not the only way to generate localised gas bubbles.

In article D1, localised gas bubbles are produced other than by electrodes immersed in an electrolytic medium.

There are other manners for the localised generation of gas bubbles such as, to give non-limiting examples, the use of the cavitation phenomenon or use of a chemical reaction.

Therefore, more generally, the displacement of gas bubbles can be obtained in a liquid medium of gel type or more simply in any medium permitting the displacement of produced gas bubbles.

In the invention, the operating mode for the production of localised gas bubbles is of no importance, the key point being that the gas bubbles produced are able to be locally subjected to ultrasound.

Also, the invention is not limited to the production of several gas bubbles. It can be fully envisaged to focus on the production of a single gas bubble.

For example, this can be obtained using the device described in connection with Example 1, the signal received from source 4 being a Dirac peak. The amplitude of this Dirac peak can be controlled and said peak always contains frequency information which will effectively allow the production of said bubble. The ultrasound burst is then generated in the direction of said at least one gas bubble conforming to the description given for Example 1. The burst is therefore emitted over a burst length at least partly overlapping the time during which gas is effectively produced (here the Dirac peak length).

It is still possible to generate a succession of ultrasound bursts, but this is not necessary in this case.

Under these conditions, a gas bubble of well controlled size can be generated. Knowledge of this bubble size can then allow the determination of certain characteristics of the medium in which the gas bubble is displaced.

The invention claimed is:

1. A method to control at least one gas bubble produced in localized manner in a medium allowing the displacement of a plurality of gas bubbles, said bubbles being produced by a first control signal of adjustable amplitude and/or frequency, said first control signal being generated by a voltage source connected to an electrode and a counter electrode so that gas is produced, said method comprising a step consisting of generating a plurality of ultrasound bursts towards said bubbles, said bursts being emitted over a burst length at least partly overlapping the duration of gas production,
   wherein locally produced gas bubbles are produced at a controlled frequency of production equal to the frequency of the first control signal, and
   wherein ultrasound bursts are generated at a repeat frequency equal to or substantially equal to the controlled frequency of localized production of the gas bubbles.

2. The method according to claim 1, further comprising the following steps:
   applying said first control signal between the electrode and the counter-electrode immersed in an electrolytic medium, the electrode having a pointed tip;
   controlling the frequency and amplitude of said first control signal to produce gas bubbles in the electrolytic medium in localized manner at the tip of the electrode at said controlled frequency of production.

3. The method according to claim 2, wherein the first control signal is sinusoidal, rectangular, sawtooth or in the form of a Dirac comb.

4. The method according to claim 2, wherein the first control signal is alternating.

5. The method according to claim 2, wherein the first control signal is a Dirac peak.

6. The method according to claim 2, wherein the amplitude of the first control signal is modified to control the size of said gas bubbles produced.

7. The method according to claim 1, wherein the controlled frequency of localized production of gas bubbles and the repeat frequency of the ultrasound bursts are modified so that the repeat frequency remains equal to or substantially equal to the controlled frequency of localized gas bubble production to modify the spacing between the bubbles.

8. The method according to claim 1, further comprising the following steps:

applying said first control signal between the electrode and the counter-electrode immersed in an electrolytic medium, the electrode having the shape of a pointed tip;

controlling the amplitude of said first control signal to produce said at least one gas bubble in the electrolytic medium in localized manner at the tip of the electrode.

9. The method according to claim 1, further comprising a step to adjust the length of said ultrasound bursts, to control the size of said gas bubbles produced.

10. The method according to claim 1, further comprising a step to start an ultrasound burst after the start of production of said gas bubbles.

11. The method according to claim 1, wherein the electrolytic medium allowing the displacement of said gas bubbles is a liquid medium or a gel.

12. The method according to claim 1, wherein the electrolytic medium allowing the displacement of said gas bubbles is a non-chemically controlled liquid medium.

13. The method according to claim 12, wherein the non-chemically controlled liquid medium is an aqueous medium.

14. The method according to claim 1, wherein said ultrasound bursts comprise ultrasound waves having an acoustic pressure of between 5 kPa and 15 kPa.

15. The method according to claim 13, wherein the aqueous medium is tap water.

* * * * *